Patented July 13, 1926.

1,592,603

UNITED STATES PATENT OFFICE.

FREDERICK KLEIN, OF NEW YORK, N. Y.

PROCESS OF PURIFYING AND STABILIZING HYDROCARBONS.

No Drawing. Application filed August 19, 1925. Serial No. 51,086.

This invention relates to a new and improved method of making pure organic compounds from substances obtained either by synthesis or from the destructive distillation or decomposition of coal, wood and other natural products. So far as this method is concerned it is immaterial whether the organic substance or compound is a liquid or solid, the method having been found to be operative for both classes.

To-day in order to obtain a pure organic compound, a common practice is to resort to fractional distillation, if a liquid or sublimation if a solid. This method, however, is found to be very difficult or else the yield is so small as not to warrant the use of such a method on a commercial scale. To-day in order to purify organic compounds as for instance terpenes found in turpentine, gum or oil of turpentine or other wood distillation products of this polycyclic chemical nature, the terpene-containing substance is subjected to a fractional distillation. In this method at least three fractional distillations must be taken in order to obtain a substance having a substantially constant boiling point. This method has a yield on the average of 50% or 60% and the residues consist principally of high boiling liquids, polymerization products, and resinous substances.

The invention hereinafter disclosed overcomes these difficulties and it has for an object the manufacture of substantially pure, constant boiling hydrocarbons and polycyclic hydrocarbons by a new and improved method of distillation.

Further, said invention has for its object a purification method for hydrocarbons which method gives a yield greater than that obtained by the ordinary method of fractional distillation.

Further, said invention has for its object the production of a constant boiling terpene.

Still further objects will appear from the hereinafter described method and from the subjoining claims.

I have discovered that by subjecting the impure hydrocarbon or polycyclic hydrocarbon to a distillation in which it is alternately and successively heated and cooled a product substantially pure and having a substantially constant boiling point is obtained. This is because the entire fractional yield of the distillation at a temperature for example of 155° C.-156° C. is removed from the container of the distilling apparatus, and condensed in a separate container, the residue of the hydrocarbon then being allowed to cool down to room temperature. Then said residue is again subjected to distillation at the same temperature of 155° C.-156° C., and will be found to give a further yield which can be added to the first yield. Similarly succeeding coolings to room temperature and heatings to 155° C.-156° C. will I have found increase the total yield until it amounts to 80% to 90% of the original substance, and provides a pure product having a constant boiling point. The highest temperature that I have found preferable is the same as the boiling point of the compound desired and the lowest that of the room where the distillation is performed. The yield obtained by this method is from 30% to 40% greater than that obtained in the ordinary and usual fractional distillation, representing a total yield of 80% to 90%.

The above method may be of course modified in many ways. One of the modifications which I have successfully employed comprises applying this new method of distillation to a fraction of the compound obtained in the ordinary fractional distillation.

The following examples of this new method are given by way of illustration and not of limitation.

Any quantity of the hydrocarbon is placed in a distilling apparatus and gradually heated up to the boiling point of the pure compound; for example, in the case of terpene, the turpentine containing terpene, gum turpentine, or other terpene-containing substances is alternately and successively heated to about 156° C. and then cooled to about 20° or 30° C. This alternate and successive heating and cooling is continued until no more terpene is distilled.

In the modification, a fraction having a boiling point between 150° and 165° C. of the terpene-containing substance is first obtained as in the ordinary method of fractional distillation and this fraction is subjected to the alternate and successive heating to 156° C. and cooling to 20° to 30° C. Of course, any other desirable fraction may be used instead of the one above given.

It is found that the above methods increase the yield 30% to 40% making a total yield of 80% to 90% and produce a product substantially pure and having a constant boiling point. These pure compounds display an increased chemical activity with the halogens, acids and especially oxygen. In the case of the terpenes the products obtained are especially adapted for the manufacture of synthetic camphor and perfumes and show very little resinous material.

Some changes may be made in the method above set forth without departing from the real purpose and spirit thereof and it is the intention to cover by the following claims any modified procedure in carrying out this method which may be reasonably included within their scope.

I claim:

1. A process of distilling a hydrocarbon which comprises alternately and successively heating and cooling the hydrocarbon in one container, the heating being aproximately to the boiling point of the distillate desired.

2. A process of making a constant boiling point hydrocarbon by distillation comprising alternately and successively heating and cooling the hydrocarbon containing substance in one container, the heating being to the boiling point of the hydrocarbon.

3. A process of making a constant boiling point hydrocarbon by distillation comprising alternately and successively heating and cooling the hydrocarbon containing substance in one container, the heating being to the boiling point of the hydrocarbon, and the cooling to approximately room temperature.

4. A process of making a polycyclic hydrocarbon having a constant boiling point comprising alternately and successively heating and cooling the polycyclic hydrocarbon containing substance in one container, the heating being to approximately the boiling point of the polycyclic hydrocarbon.

5. A process of making a polycyclic hydrocarbon having a constant boiling point comprising alternately and successively heating and cooling the polycyclic hydrocarbon containing substance in one container, the heating being to approximately the boiling point of the polycyclic hydrocarbon, and the cooling to room temperature.

6. A process of making a substantially pure terpene having a constant boiling point by distillation which comprises alternately and successively heating and cooling a terpene containing substance in one container, the heating being to approximately the boiling point of the terpene.

7. A process of making a substantially pure terpene having a constant boiling point by distillation which comprises alternately and successively heating and cooling a terpene containing substance in one container, the heating being to approximately the boiling point of the terpene, and the cooling to room temperature.

8. A process of making a substantially pure terpene having a constant boiling point by distillation which comprises alternately and successively heating and cooling the terpene containing substance in one container, the heating being to 156° C. and the cooling to approximately 20–30° C.

9. A process of making a substantially pure terpene having a constant boiling point by distillation which comprises alternately and successively heating and cooling oil of turpentine in one container, the heating being to 156° C. and the cooling to approximately 20° C.

10. A process of making a hydrocarbon having a constant boiling point by distillation comprising fractionating the hydrocarbon containing material and then subjecting the fraction containing the hydrocarbon to alternate and successive heating and cooling in one container, the heating being to approximately the boiling point of the hydrocarbon.

11. A process of making a hydrocarbon having a constant boiling point by distillation comprising fractionating the hydrocarbon containing material and then subjecting the fraction containing the hydrocarbon to alternate and successive heating and cooling in one container, the heating being to approximately the boiling point of the hydrocarbon and the cooling to room temperature.

12. A process of making a polycyclic hydrocarbon having a constant boiling point by distillation comprising fractionating the polycyclic hydrocarbon containing material and then subjecting the fraction containing the polycyclic hydrocarbon to alternate and successive heating and cooling in one container, the heating being to approximately the boiling point of the polycyclic hydrocarbon.

13. A process of making a constant boiling point terpene by distillation comprising fractionally distilling the terpene containing substance and alternately and successively heating and cooling the fraction in one container, the fraction boiling between 150–165° C. to 156° C. and the cooling being to approximately 20° C.

14. A process of making a constant boiling point terpene by distillation comprising fractionally distilling oil of turpentine, collecting the fraction boiling from 150–165° C., and alternately and successively heating and cooling said fraction in one container, the heating being to 156° C., and the cooling approximately to 20° C.

Executed this 17th day of August, 1925.

FREDERICK KLEIN.